United States Patent
Kerner et al.

(10) Patent No.: US 11,859,658 B2
(45) Date of Patent: Jan. 2, 2024

(54) STEERING SENSOR DRIVE FOR ARTICULATING BALL JOINT

(71) Applicant: CNH Industrial America LLC, New Holland, PA (US)

(72) Inventors: Richard D. Kerner, West Fargo, ND (US); Thomas J. Paulson, Fargo, ND (US)

(73) Assignee: CNH Industrial America LLC, New Holland, PA (US)

( * ) Notice: Subject to any disclaimer, the term of this patent is extended or adjusted under 35 U.S.C. 154(b) by 148 days.

(21) Appl. No.: 17/404,878

(22) Filed: Aug. 17, 2021

(65) Prior Publication Data

US 2023/0054676 A1 Feb. 23, 2023

(51) Int. Cl.
| | |
|---|---|
| *F16C 11/06* | (2006.01) |
| *B62D 7/18* | (2006.01) |
| *B62D 7/16* | (2006.01) |

(52) U.S. Cl.
CPC ............ *F16C 11/0671* (2013.01); *B62D 7/16* (2013.01); *B62D 7/18* (2013.01); *F16C 11/0604* (2013.01); *F16C 2326/05* (2013.01); *F16C 2326/24* (2013.01)

(58) Field of Classification Search
CPC .............. F16C 11/0671; F16C 11/0604; F16C 2326/05; F16C 2326/24; B62D 7/16; B62D 7/18
See application file for complete search history.

(56) References Cited

U.S. PATENT DOCUMENTS

| | | | | |
|---|---|---|---|---|
| 3,438,646 A | * | 4/1969 | Martin | B62D 17/00 |
| | | | | 280/93.5 |
| 5,011,321 A | * | 4/1991 | Kidokoro | F16C 11/0685 |
| | | | | 403/140 |
| 5,876,149 A | * | 3/1999 | Dorr | F16C 11/0671 |
| | | | | 403/135 |
| 6,261,182 B1 | | 7/2001 | Chino et al. | |
| 6,287,040 B1 | * | 9/2001 | Fischer | F16J 3/042 |
| | | | | 277/635 |
| 6,505,989 B1 | * | 1/2003 | Pazdirek | F16C 11/0638 |
| | | | | 403/135 |
| 6,773,196 B2 | * | 8/2004 | Broker | F16C 11/069 |
| | | | | 403/135 |

(Continued)

*Primary Examiner* — Paul N Dickson
*Assistant Examiner* — Timothy Wilhelm
(74) *Attorney, Agent, or Firm* — Rickard DeMille; Rebecca Henkel

(57) ABSTRACT

A steering system includes an arm, a knuckle, a joint, and a steering sensor. The arm defines a first passage. The knuckle has a knuckle arm defining a second passage. The joint has a ball portion and a shaft portion extending. The ball portion is disposed within the first passage and the shaft portion is disposed within the second passage. The ball portion defines a conical recess that has an opening at an upper end of the ball portion and terminates inside the ball portion with a pocket. The steering sensor has a driveshaft extending along a longitudinal axis into the conical recess. The driveshaft includes a head that engages with the pocket. The ball portion is configured to pivot within the first passage relative to the longitudinal axis and the head. The joint and the driveshaft are configured to rotate together about the longitudinal axis as the knuckle is turned.

20 Claims, 12 Drawing Sheets

(56) References Cited

U.S. PATENT DOCUMENTS

| | | | | |
|---|---|---|---|---|
| 7,296,810 B2* | 11/2007 | Thannikary | G01D 11/245 | |
| | | | 280/93.5 | |
| 7,347,433 B2* | 3/2008 | Pressler | B62D 15/023 | |
| | | | 280/93.5 | |
| 7,413,201 B2* | 8/2008 | Freytag | B60G 3/24 | |
| | | | 403/27 | |
| 7,520,691 B2* | 4/2009 | Dearing | F16C 17/24 | |
| | | | 403/135 | |
| 7,712,753 B2* | 5/2010 | McCann | B60G 3/06 | |
| | | | 280/93.511 | |
| 8,376,647 B2* | 2/2013 | Kuroda | B60G 7/005 | |
| | | | 403/134 | |
| 10,173,487 B2* | 1/2019 | von der Haar | B60G 7/005 | |
| 10,415,633 B2* | 9/2019 | Kuroda | F16C 11/0647 | |
| 10,625,778 B2* | 4/2020 | Buchwitz | B60B 27/065 | |
| 11,268,567 B2* | 3/2022 | Sokolihs | F16C 11/0671 | |
| 11,473,615 B2* | 10/2022 | Smith | F16B 39/10 | |
| 2006/0022420 A1* | 2/2006 | Pressler | B62D 15/023 | |
| | | | 280/93.512 | |
| 2019/0092209 A1 | 3/2019 | Friesen et al. | | |
| 2021/0122410 A1* | 4/2021 | Wöllner | B62D 5/0481 | |
| 2021/0339799 A1* | 11/2021 | Tonini | B62D 15/023 | |

\* cited by examiner

STEERING SENSOR DRIVE FOR ARTICULATING BALL JOINT

BACKGROUND

Vehicles can include control arm, steering knuckle, and wheel hub assemblies with independent front suspensions. In such vehicles, accurately tracking the steering of the front wheels can be difficult because of both the pivoting of the wheel hubs during turning events, and articulation of the control arm and wheel hub assemblies while the suspension moves between full jounce and full rebound.

SUMMARY

One embodiment relates to a steering system for a machine. The steering system includes a control arm, a steering knuckle, a ball joint, and a steering sensor. The control arm has a first end and an opposing second end. The first end is configured to couple to a chassis of the machine. The opposing second end defines a first passage extending therethrough. The steering knuckle has a knuckle arm defining a second passage extending therethrough. The steering knuckle is configured to couple to a steering linkage assembly of the machine to facilitate turning the steering knuckle. The ball joint has a ball portion and a shaft portion extending from the ball portion. The ball portion is disposed within the first passage and the shaft portion is disposed within the second passage. The ball portion defines a conical recess that (i) has an opening at an upper end of the ball portion and (ii) terminates inside the ball portion with a shaft head pocket. The steering sensor has a driveshaft extending along a longitudinal axis into the conical recess of the ball portion. The driveshaft includes a shaft head that engages with the shaft head pocket. The ball portion is configured to pivot within the first passage of the control arm relative to the longitudinal axis and the shaft head of the driveshaft. The ball joint and the driveshaft are configured to rotate together about the longitudinal axis as the steering knuckle is turned.

Another embodiment relates to a ball joint coupling assembly for a steering system of a machine. The ball joint coupling assembly defines a longitudinal axis. The ball joint coupling assembly includes a ball joint housing, a mounting plate, a ball joint, and a steering sensor. The ball joint housing is configured to be received within a first passage of a control arm of the steering system. The ball joint housing defines a ball pocket and a first sensor passageway that connects to the ball pocket. The ball joint housing has a peripheral lip extending radially outward from a lower end of the ball joint housing. The peripheral lip is configured to engage with a lower mounting surface of the control arm. The mounting plate is configured to be positioned along an upper mounting surface of the control arm. The mounting plate is coupled to the ball joint housing. The mounting plate defines a second sensor passageway that aligns with the first sensor passageway. The ball joint includes a ball portion and a shaft portion extending from the ball portion. The ball portion is disposed within the ball pocket. The ball portion defines a conical recess that aligns with the first sensor passageway and the second sensor passageway. The conical recess (i) has an opening at an upper end of the ball portion and (ii) terminates inside the ball portion with a shaft head pocket. The shaft portion is configured to engage with an interface of a steering knuckle of the steering system. The steering sensor includes a sensor head and a driveshaft. The sensor head is coupled to a top surface of the mounting plate. The driveshaft extends from the sensor head along the longitudinal axis into the conical recess of the ball portion. The driveshaft has a shaft head that engages with the shaft head pocket. The ball portion is configured to pivot within the ball pocket relative to the longitudinal axis and the shaft head of the driveshaft. The ball joint and the driveshaft are configured to rotate together about the longitudinal axis as the steering knuckle is turned.

Still another embodiment relates to a steering system for a machine. The steering system includes a control arm, a steering knuckle, and a ball joint coupling assembly. The control arm has a first end and an opposing second end. The first end is configured to couple to a chassis of the machine. The opposing second end of the control arm defines an upper mounting surface, a lower mounting surface, and a first passage extending between the upper mounting surface and the lower mounting surface. The steering knuckle has a knuckle arm defining a second passage extending therethrough. The steering knuckle is configured to couple to a steering linkage assembly of the machine to facilitate turning the steering knuckle. The ball joint coupling assembly includes a ball joint housing, a mounting plate, a ball joint, and a steering sensor. The ball joint housing is disposed within the first passage of the control arm. The ball joint housing defines a ball pocket and a first sensor passageway that connects to the ball pocket. The ball joint housing has a peripheral lip extending radially outward from a lower end of the ball joint housing. The peripheral lip is in engagement with the lower mounting surface of the control arm. The mounting plate is positioned along the upper mounting surface of the control arm. The mounting plate is coupled to the ball joint housing. The mounting plate defines a second sensor passageway that aligns with the first sensor passageway. The ball joint includes a ball joint portion and a shaft portion extending from the ball portion. The ball portion is disposed within the ball pocket. The ball portion defines a conical recess that aligns with the first sensor passageway and the second sensor passageway. The conical recess (i) has an opening at an upper end of the ball portion and (ii) terminates inside the ball portion with a shaft head pocket. The shaft portion is disposed within the second passage of the steering knuckle. The steering sensor includes a sensor head and a driveshaft. The sensor head is coupled to a top surface of the mounting plate. The driveshaft extends from the sensor head into the conical recess of the ball portion. The driveshaft has a shaft head that engages with the shaft head pocket.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vehicle of the present disclosure includes a control arm and steering knuckle assembly with an independent suspension that includes a control arm, a steering knuckle, and a ball joint coupling assembly coupling the control arm to the steering knuckle. The ball joint coupling assembly includes a steering sensor and various components that facilitate monitoring steering angle motion of the steering knuckle, and therefore a wheel hub and wheel coupled thereto, in every position of the suspension. Specifically, the steering monitoring is independent of and not directly affected by relative movement of the steering knuckle and the control arm during articulation of the suspension between full joust and full rebound.

Overall Vehicle

Figure 1:
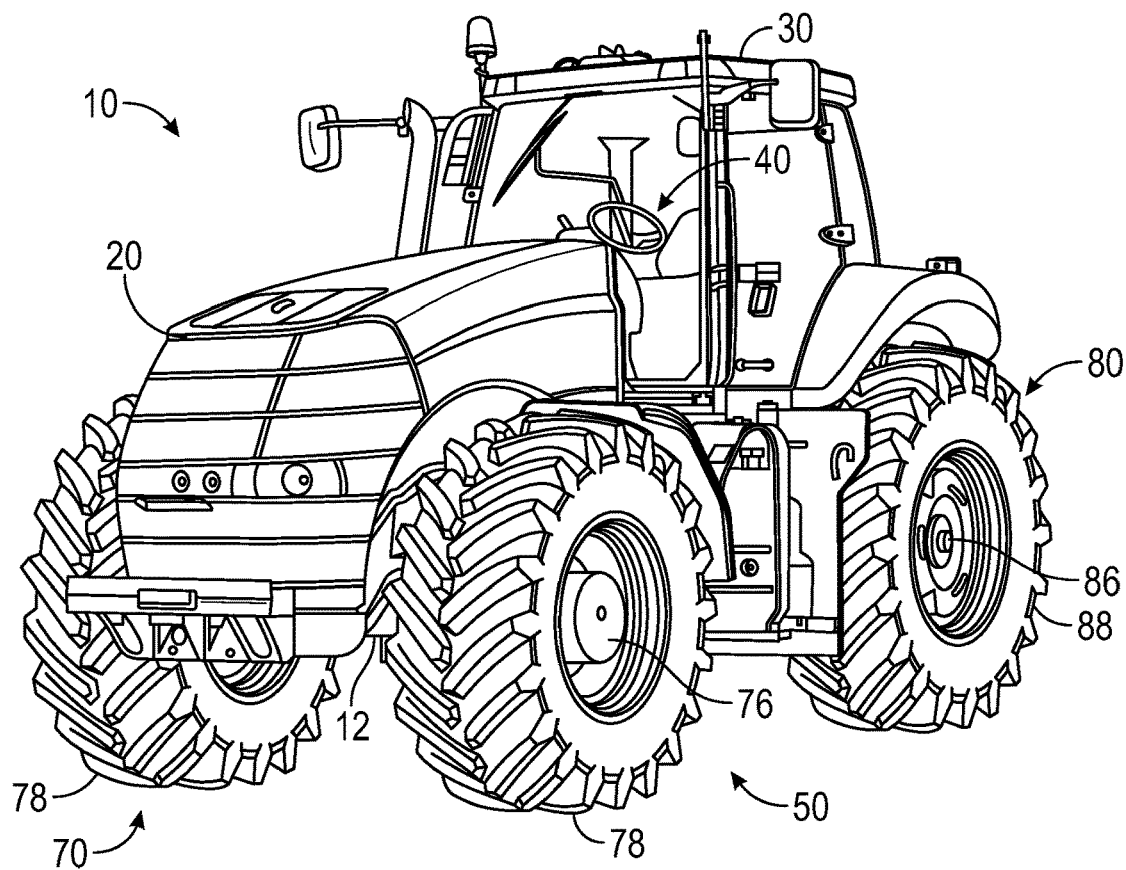
FIG. 1 is a perspective view of a vehicle, according to an exemplary embodiment.
Figure 2:
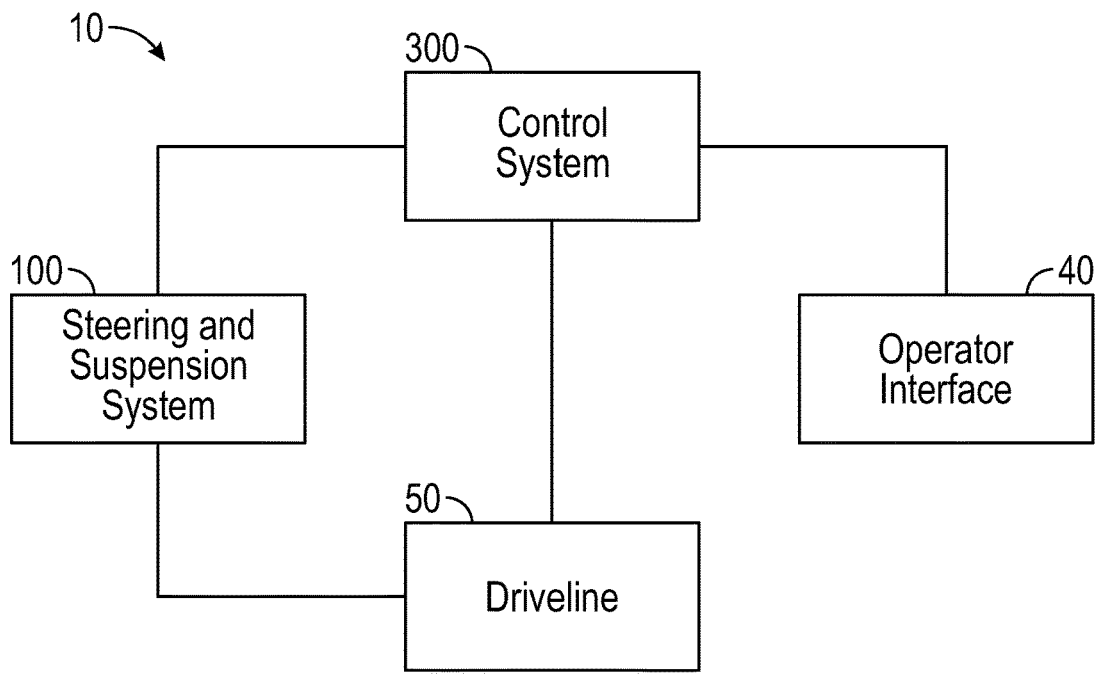
FIG. 2 is a schematic block diagram of the vehicle of FIG. 1, according to an exemplary embodiment.
Figure 3:
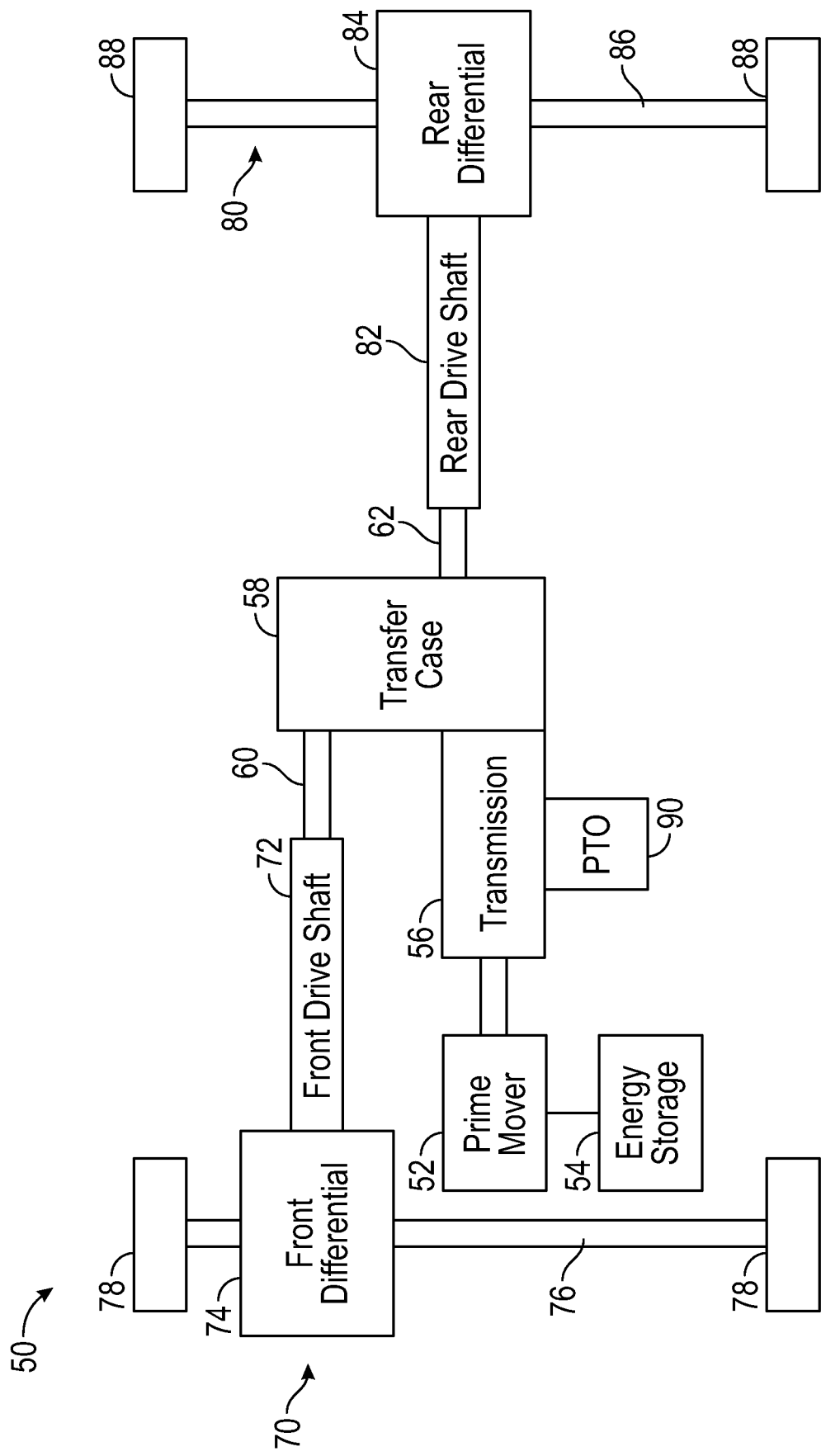
FIG. 3 is a schematic block diagram of a driveline of the vehicle of FIG. 1, according to an exemplary embodiment.

According to the exemplary embodiment shown in FIGS. 1-3, a machine or vehicle, shown as vehicle 10, includes a chassis, shown as frame 12; a body assembly, shown as body 20, coupled to the frame 12 and having an occupant portion or section, shown as cab 30; operator input and output devices, shown as operator interface 40, that are disposed within the cab 30; a drivetrain, shown as driveline 50, coupled to the frame 12 and at least partially disposed under the body 20; a vehicle steering and suspension assembly, shown as steering and suspension system 100, configured to facilitate steering the vehicle 10; and a vehicle control system, shown as control system 300, coupled to the operator interface 40, the driveline 50, and the steering and suspension system 100. In other embodiments, the vehicle 10 includes more or fewer components.

According to an exemplary embodiment, the vehicle 10 is an off-road machine or vehicle. In some embodiments, the off-road machine or vehicle is an agricultural machine or vehicle such as a tractor, a telehandler, a front loader, a combine harvester, a grape harvester, a forage harvester, a sprayer vehicle, a speedrower, and/or another type of agricultural machine or vehicle. In some embodiments, the off-road machine or vehicle is a construction machine or vehicle such as a skid steer loader, an excavator, a backhoe loader, a wheel loader, a bulldozer, a telehandler, a motor grader, and/or another type of construction machine or vehicle. In some embodiments, the vehicle 10 includes one or more attached implements and/or trailed implements such as a front mounted mower, a rear mounted mower, a trailed mower, a tedder, a rake, a baler, a plough, a cultivator, a rotavator, a tiller, a harvester, and/or another type of attached implement or trailed implement.

According to an exemplary embodiment, the cab 30 is configured to provide seating for an operator (e.g., a driver, etc.) of the vehicle 10. In some embodiments, the cab 30 is configured to provide seating for one or more passengers of the vehicle 10. According to an exemplary embodiment, the operator interface 40 is configured to provide an operator with the ability to control one or more functions of and/or provide commands to the vehicle 10 and the components thereof (e.g., turn on, turn off, drive, turn, brake, engage various operating modes, raise/lower an implement, etc.). The operator interface 40 may include one or more displays and one or more input devices. The one or more displays may be or include a touchscreen, a LCD display, a LED display, a speedometer, gauges, warning lights, etc. The one or more input device may be or include a steering wheel, a joystick, buttons, switches, knobs, levers, an accelerator pedal, a brake pedal, etc.

According to an exemplary embodiment, the driveline 50 is configured to propel the vehicle 10. As shown in FIG. 3, the driveline 50 includes a primary driver, shown as prime mover 52, and an energy storage device, shown as energy storage 54. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system.

As shown in FIG. 3, the driveline 50 includes a transmission device (e.g., a gearbox, a continuous variable transmission ("CVT"), etc.), shown as transmission 56, coupled to the prime mover 52; a power divider, shown as transfer case 58, coupled to the transmission 56; a first tractive assembly, shown as front tractive assembly 70, coupled to a first output of the transfer case 58, shown as front output 60; and a second tractive assembly, shown as rear tractive assembly 80, coupled to a second output of the transfer case 58, shown as rear output 62. According to an exemplary embodiment, the transmission 56 has a variety of configurations (e.g., gear ratios, etc.) and provides different output speeds relative to a mechanical input received thereby from the prime mover 52. In some embodiments (e.g., in electric driveline configurations, in hybrid driveline configurations, etc.), the driveline 50 does not include the transmission 56. In such embodiments, the prime mover 52 may be directly coupled to the transfer case 58. According to an exemplary embodiment, the transfer case 58 is configured to facilitate driving both the front tractive assembly 70 and the rear tractive assembly 80 with the prime mover 52 to facilitate front and rear drive (e.g., an all-wheel-drive vehicle, a four-wheel-drive vehicle, etc.). In some embodiments, the transfer case 58 facilitates selectively engaging rear drive only, front drive only, and both front and rear drive simultaneously. In some embodiments, the transmission 56 and/or the transfer case 58 facilitate selectively disengaging the front tractive assembly 70 and the rear tractive assembly 80 from the prime mover 52 (e.g., to permit free movement of the front tractive assembly 70 and the rear tractive assembly 80 in a neutral mode of operation). In some embodiments, the driveline 50 does not include the transfer case 58. In such embodiments, the prime mover 52 or the transmission 56 may directly drive the front tractive assembly 70 (i.e., a front-wheel-drive vehicle) or the rear tractive assembly 80 (i.e., a rear-wheel-drive vehicle).

As shown in FIGS. 1 and 3, the front tractive assembly 70 includes a first drive shaft, shown as front drive shaft 72, coupled to the front output 60 of the transfer case 58; a first differential, shown as front differential 74, coupled to the front drive shaft 72; a first axle, shown front axle 76, coupled to the front differential 74; and a first pair of tractive elements, shown as front tractive elements 78, coupled to the front axle 76. In some embodiments, the front tractive assembly 70 includes a plurality of front axles 76. In some embodiments, the front tractive assembly 70 does not include the front drive shaft 72 or the front differential 74 (e.g., a rear-wheel-drive vehicle). In some embodiments, the front drive shaft 72 is directly coupled to the transmission 56 (e.g., in a front-wheel-drive vehicle, in embodiments where the driveline 50 does not include the transfer case 58, etc.) or the prime mover 52 (e.g., in a front-wheel-drive vehicle, in embodiments where the driveline 50 does not include the transfer case 58 or the transmission 56, etc.). The front axle 76 may include one or more components.

As shown in FIGS. 1 and 3, the rear tractive assembly 80 includes a second drive shaft, shown as rear drive shaft 82, coupled to the rear output 62 of the transfer case 58; a second differential, shown as rear differential 84, coupled to the rear drive shaft 82; a second axle, shown rear axle 86, coupled to the rear differential 84; and a second pair of tractive elements, shown as rear tractive elements 88, coupled to the rear axle 86. In some embodiments, the rear tractive assembly 80 includes a plurality of rear axles 86. In some embodiments, the rear tractive assembly 80 does not include the rear drive shaft 82 or the rear differential 84 (e.g., a front-wheel-drive vehicle). In some embodiments, the rear drive shaft 82 is directly coupled to the transmission 56 (e.g., in a rear-wheel-drive vehicle, in embodiments where the driveline 50 does not include the transfer case 58, etc.) or the prime mover 52 (e.g., in a rear-wheel-drive vehicle, in embodiments where the driveline 50 does not include the transfer case 58 or the transmission 56, etc.). The rear axle 86 may include one or more components. According to the exemplary embodiment shown in FIG. 1, the front tractive elements 78 and the rear tractive elements 88 are structured as wheels. In other embodiments, the front tractive elements 78 and the rear tractive elements 88 are otherwise structured (e.g., tracks, etc.). In some embodiments, the front tractive elements 78 and the rear tractive elements 88 are both steerable. In other embodiments, only one of the front tractive elements 78 or the rear tractive elements 88 is steerable. In still other embodiments, both the front tractive elements 78 and the rear tractive elements 88 are fixed and not steerable.

In some embodiments, the driveline 50 includes a plurality of prime movers 52. By way of example, the driveline 50 may include a first prime mover 52 that drives the front tractive assembly 70 and a second prime mover 52 that drives the rear tractive assembly 80. By way of another example, the driveline 50 may include a first prime mover 52 that drives a first one of the front tractive elements 78, a second prime mover 52 that drives a second one of the front tractive elements 78, a third prime mover 52 that drives a first one of the rear tractive elements 88, and/or a fourth prime mover 52 that drives a second one of the rear tractive elements 88. By way of still another example, the driveline 50 may include a first prime mover that drives the front tractive assembly 70, a second prime mover 52 that drives a first one of the rear tractive elements 88, and a third prime mover 52 that drives a second one of the rear tractive elements 88. By way of yet another example, the driveline 50 may include a first prime mover that drives the rear tractive assembly 80, a second prime mover 52 that drives a first one of the front tractive elements 78, and a third prime mover 52 that drives a second one of the front tractive elements 78. In such embodiments, the driveline 50 may not include the transmission 56 or the transfer case 58.

As shown in FIG. 3, the driveline 50 includes a power-take-off ("PTO"), shown as PTO 90. While the PTO 90 is shown as being an output of the transmission 56, in other embodiments the PTO 90 may be an output of the prime mover 52, the transmission 56, and/or the transfer case 58. According to an exemplary embodiment, the PTO 90 is configured to facilitate driving an attached implement and/or a trailed implement of the vehicle 10. In some embodiments, the driveline 50 includes a PTO clutch positioned to selectively decouple the driveline 50 from the attached implement and/or the trailed implement of the vehicle 10 (e.g., so that the attached implement and/or the trailed implement is only operated when desired, etc.).

According to an exemplary embodiment, the vehicle 10 includes a braking system that includes one or more brakes (e.g., disc brakes, drum brakes, in-board brakes, axle brakes, etc.) positioned to facilitate selectively braking (i) one or more components of the driveline 50 and/or (ii) one or more components of a trailed implement. In some embodiments, the one or more brakes include (i) one or more front brakes positioned to facilitate braking one or more components of the front tractive assembly 70 and (ii) one or more rear brakes positioned to facilitate braking one or more components of the rear tractive assembly 80. In some embodiments, the one or more brakes include only the one or more front brakes. In some embodiments, the one or more brakes include only the one or more rear brakes. In some embodiments, the one or more front brakes include two front brakes, one positioned to facilitate braking each of the front tractive elements 78. In some embodiments, the one or more front brakes include at least one front brake positioned to facilitate braking the front axle 76. In some embodiments, the one or more rear brakes include two rear brakes, one positioned to facilitate braking each of the rear tractive elements 88. In some embodiments, the one or more rear brakes include at least one rear brake positioned to facilitate braking the rear axle 86. Accordingly, the braking system may include one or more brakes to facilitate braking the front axle 76, the front tractive elements 78, the rear axle 86, and/or the rear tractive elements 88. In some embodiments, the one or more brakes additionally include one or more trailer brakes of a trailed implement attached to the vehicle 10. The trailer brakes are positioned to facilitate selectively braking one or more axles and/or one or more tractive elements (e.g., wheels, etc.) of the trailed implement.

Steering and Suspension System

Figure 4:
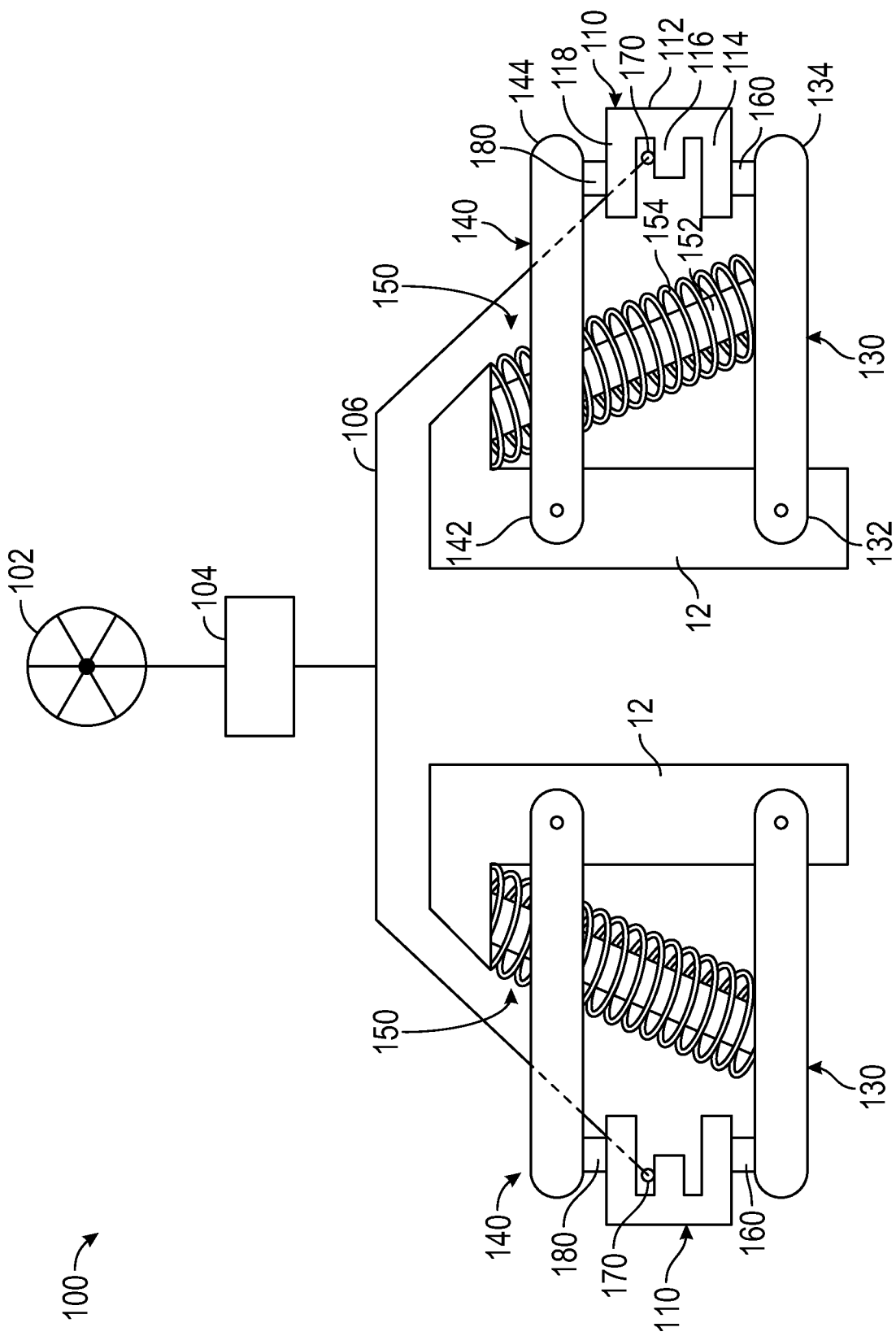
FIG. 4 is a schematic diagram of a steering and suspension system of the vehicle of FIG. 1, according to an exemplary embodiment.

As shown in FIG. 4, the steering and suspension system 100 includes an operator input device, shown as steering wheel 102; a gearing assembly, shown as steering box 104, coupled to the steering wheel 102 (e.g., by a steering column, etc.); a linkage assembly, shown as steering linkage assembly 106, coupled to the steering box 104 and including a plurality of linkages (e.g., tie rods, knuckle arms, a pitman arm, a center linkage, etc.); and a pair of control arm and steering knuckle assemblies, shown as control arm and steering knuckle assemblies 108, coupled to the steering linkage assembly 106. According to an exemplary embodiment, manipulating the steering wheel 102 facilitates turning components (e.g., steering knuckles, wheel hubs, etc.) of the control arm and steering knuckle assemblies 108 to steer and turn the vehicle 10. In some embodiments, the vehicle 10 does not include the steering wheel 102, rather the operator input device is or includes a joystick, a steering handlebar, or still another input device that allows an operator of the vehicle 10 to control steering thereof.

According to an exemplary embodiment, the control arm and steering knuckle assemblies 108 facilitate implementing an independent front suspension that provides independent articulation of opposing ends of the front axle 76. As shown in FIGS. 4-8, each of the control arm and steering knuckle assemblies 108 includes a tractive element spindle or steering knuckle, shown as steering knuckle 110; a first control arm, shown as lower control arm 130; a second control arm, shown as upper control arm 140; a suspension assembly, shown as coilover 150; a first coupler, shown as lower coupler 160; a second coupler, shown as intermediate coupler 170; and a third coupler, shown as upper coupler 180. According to an exemplary embodiment, the steering knuckle 110 is configured to couple to a respective wheel hub and tractive element of the vehicle 10.

As shown in FIGS. 4-8, the steering knuckle 110 includes a main body, shown as knuckle body 112, having (i) a first portion, shown as lower knuckle arm 114, protruding or extending from a lower end of the knuckle body 112, (ii) a second portion, shown as intermediate knuckle arm 116, protruding or extending from the knuckle body 112 between the lower end and an upper end thereof, and (iii) a third portion, shown as upper knuckle arm 118, protruding or extending from the upper end of the knuckle body 112. According to an exemplary embodiment, the knuckle body 112 is configured to interface with a respective front tractive element 78 of the vehicle 10. In some embodiments (e.g., a four-wheel-drive embodiment, a front-wheel-drive embodiment, etc.), the driveline 50 is configured to drive the wheel hubs coupled to the steering knuckles 110 to drive the front tractive elements 78.

Figure 5:
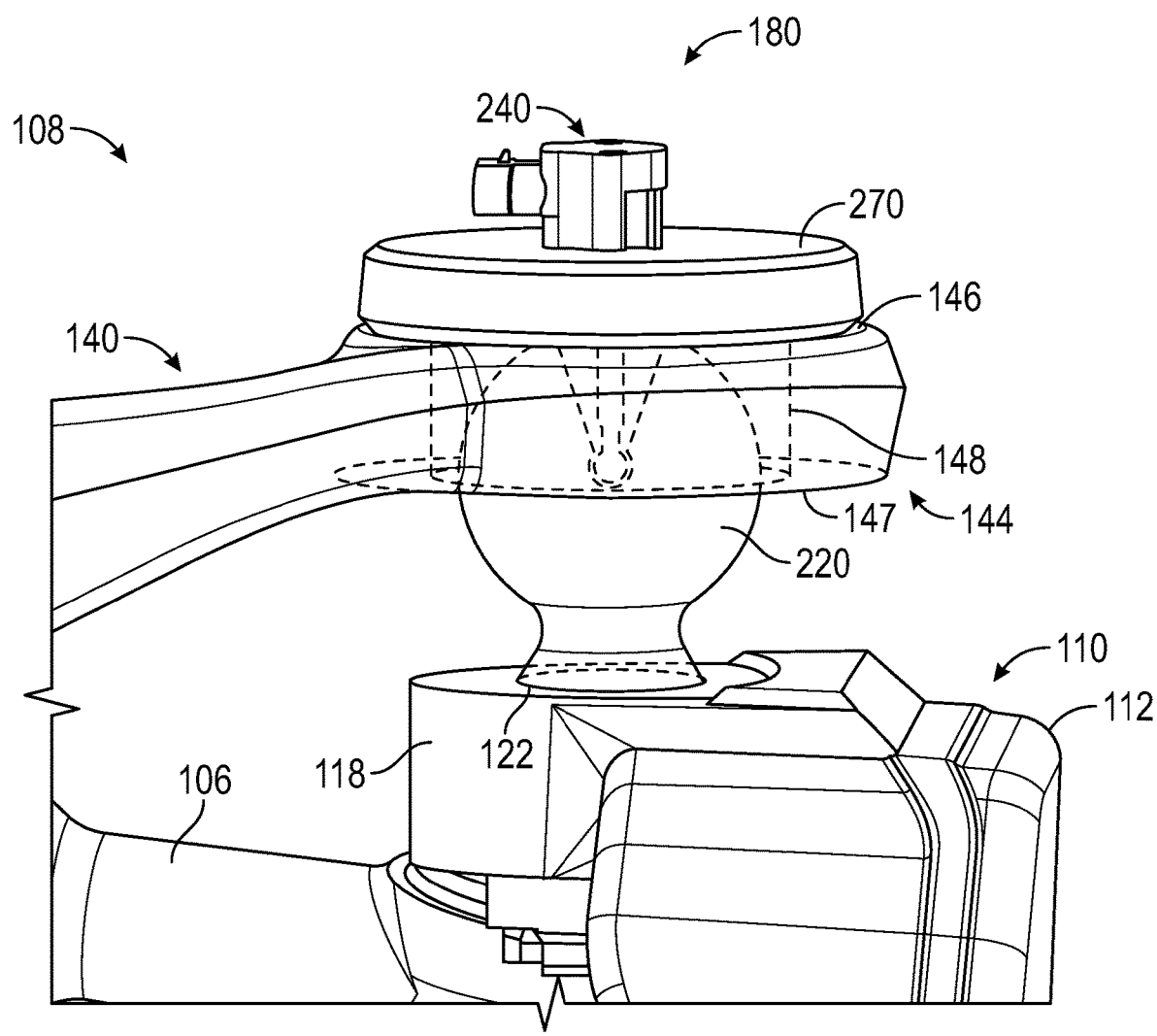
FIG. 5 is a detailed view of a control arm and steering knuckle assembly of the steering system of the vehicle of FIG. 1 including a ball joint coupling assembly, according to an exemplary embodiment.
Figure 6:
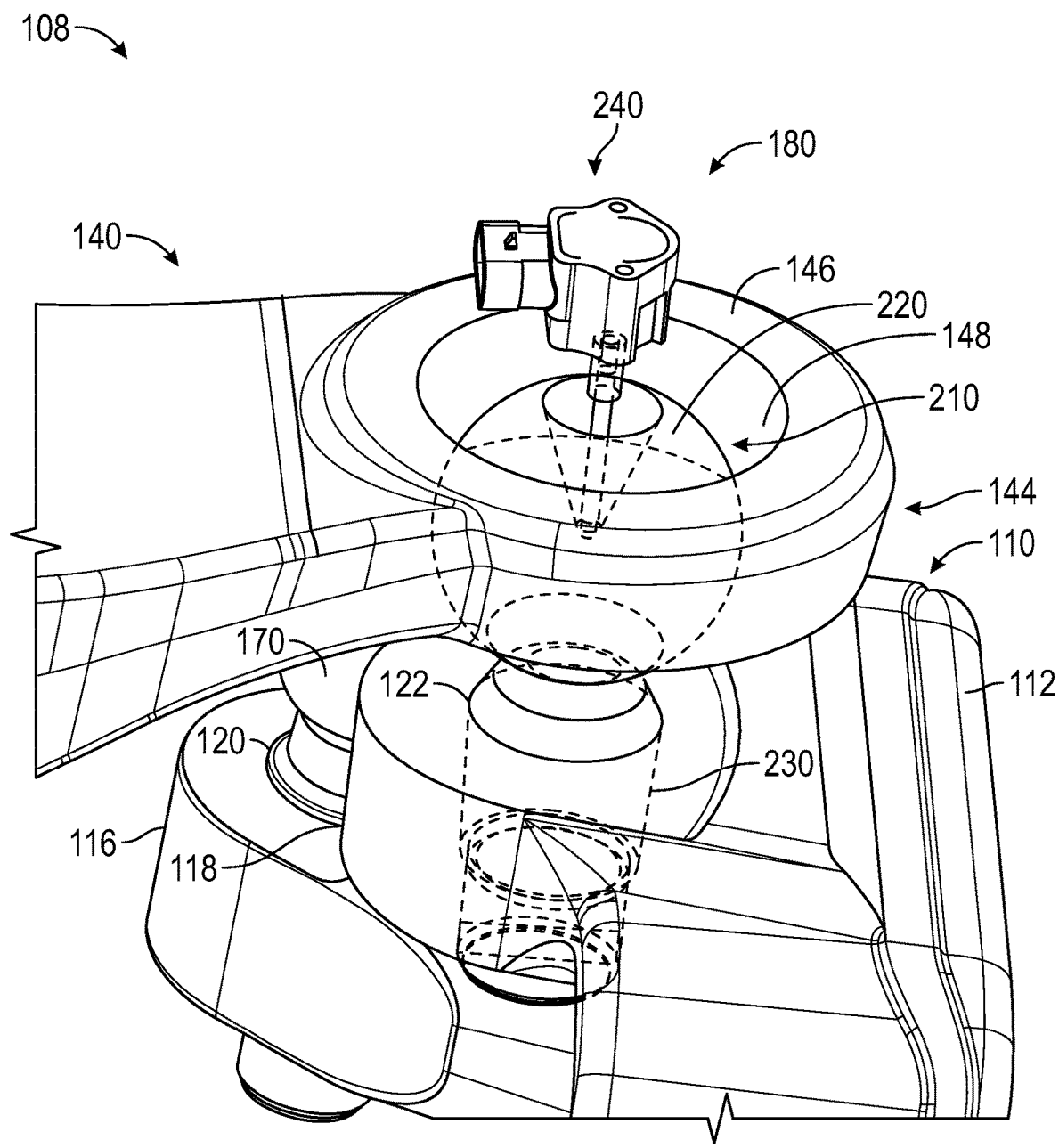
FIG. 6 is another detailed view of the control arm and steering knuckle assembly of FIG. 5, according to an exemplary embodiment.
Figure 7:
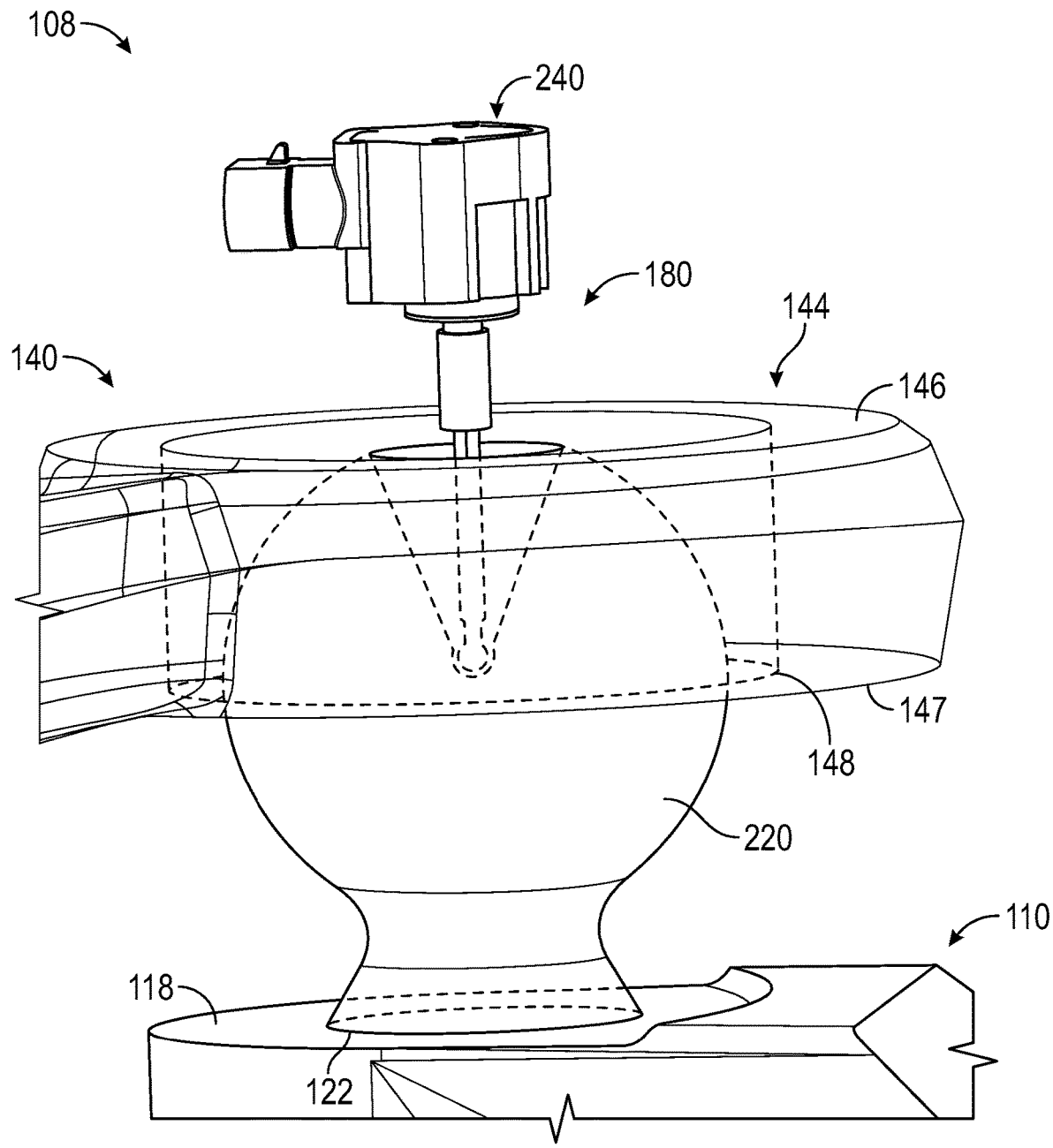
FIG. 7 is another detailed view of the control arm and steering knuckle assembly of FIG. 5, according to an exemplary embodiment.

According to an exemplary embodiment, the lower knuckle arm 114 defines a first interface, passage, or slot that receives the lower coupler 160. In another embodiment, the lower coupler 160 is integrally formed with the lower knuckle arm 114. According to an exemplary embodiment, the lower coupler 160 is or includes a ball joint. As shown in FIGS. 4 and 6, the intermediate knuckle arm 116 defines a second interface or passage, shown as intermediate knuckle slot 120, that receives the intermediate coupler 170. In another embodiment, the intermediate coupler 170 is integrally formed with the intermediate knuckle arm 116. According to the exemplary embodiment shown in FIG. 6, the intermediate coupler 170 is a ball joint. As shown in FIGS. 4-8, the upper knuckle arm 118 defines a third interface or passage, shown as upper knuckle slot 122, that receives a lower portion (e.g., the tapered shaft 230 of the ball joint 210) of the upper coupler 180. According to the exemplary embodiment shown in FIGS. 5-8, the upper coupler 180 is configured as a ball joint coupling assembly.

As shown in FIG. 4, the lower control arm 130 has a first end, shown as frame end 132, pivotally coupled to the frame 12 and an opposing second end, shown as knuckle end 134, coupled to the lower knuckle arm 114 of the steering knuckle 110 by the lower coupler 160. As shown in FIGS. 4 and 5, an end of a component of the steering linkage assembly 106 (e.g., a tire rod, etc.) is coupled to the intermediate knuckle arm 116 of the steering knuckle 110 by the intermediate coupler 170. Such coupling between the steering linkage assembly 106 and the steering knuckle 110 facilitates turning the steering knuckle 110 using the steering wheel 102. As shown in FIGS. 4-8, the upper control arm 140 has a first end, shown as frame end 142, pivotally coupled to the frame 12 and an opposing second end, shown as knuckle end 144, coupled to the upper knuckle arm 118 of the steering knuckle 110 by the upper coupler 180.

As shown in FIG. 4, each of the coilovers 150 extends from a mounting location on the frame 12 to the lower control arm 130. Each of the coilovers 150 includes a damper 152 and a coil spring 154 disposed around and along the damper. In other embodiments, other suitable suspension arrangements can be used.

As shown in FIGS. 5-8, the knuckle end 144 of the upper control arm 140 has an upper, flat surface, shown as upper mounting surface 146, and a lower, flat surface, shown as lower mounting surface 147. The knuckle end 144 of the upper control arm 140 defines an interface or passage, shown as upper control arm slot 148, that extends through the knuckle end 144 from the upper mounting surface 146 to the lower mounting surface 147, and that receives a portion (e.g., the ball joint housing 182 and the ball 220 of the ball joint 210) of the upper coupler 180.

As shown in FIGS. 5-14, the upper coupler 180 includes various components, including a housing, shown as ball joint housing 182; an upper support, shown as mounting plate 200; a pivoting joint, shown as ball joint 210; a sensor, shown as steering sensor 240; and a cover, shown as mounting plate cover 270. As shown in FIGS. 8,11,13, and 14, the upper coupler 180 defines a first longitudinal center axis, shown as longitudinal axis 280. As shown in FIGS. 8-12 and 14, the ball joint housing 182 has a first upper portion, shown as insert 184, and a second lower portion, shown as lip 186, extending around the lower periphery of the insert 184. The insert 184 defines a recess, shown as ball pocket 188, extending from the lower end of the insert 184 partially towards the upper end of the insert 184; a first aperture or passageway, shown as sensor passageway 190, extending through a center of the upper end of the insert 184 and connecting to the ball pocket 188; and a plurality of apertures, shown as plate coupling apertures 192, extending from the upper end of the insert 184 and at least partially through the body thereof, and disposed radially outward of and about the sensor passageway 190.

Figure 8:
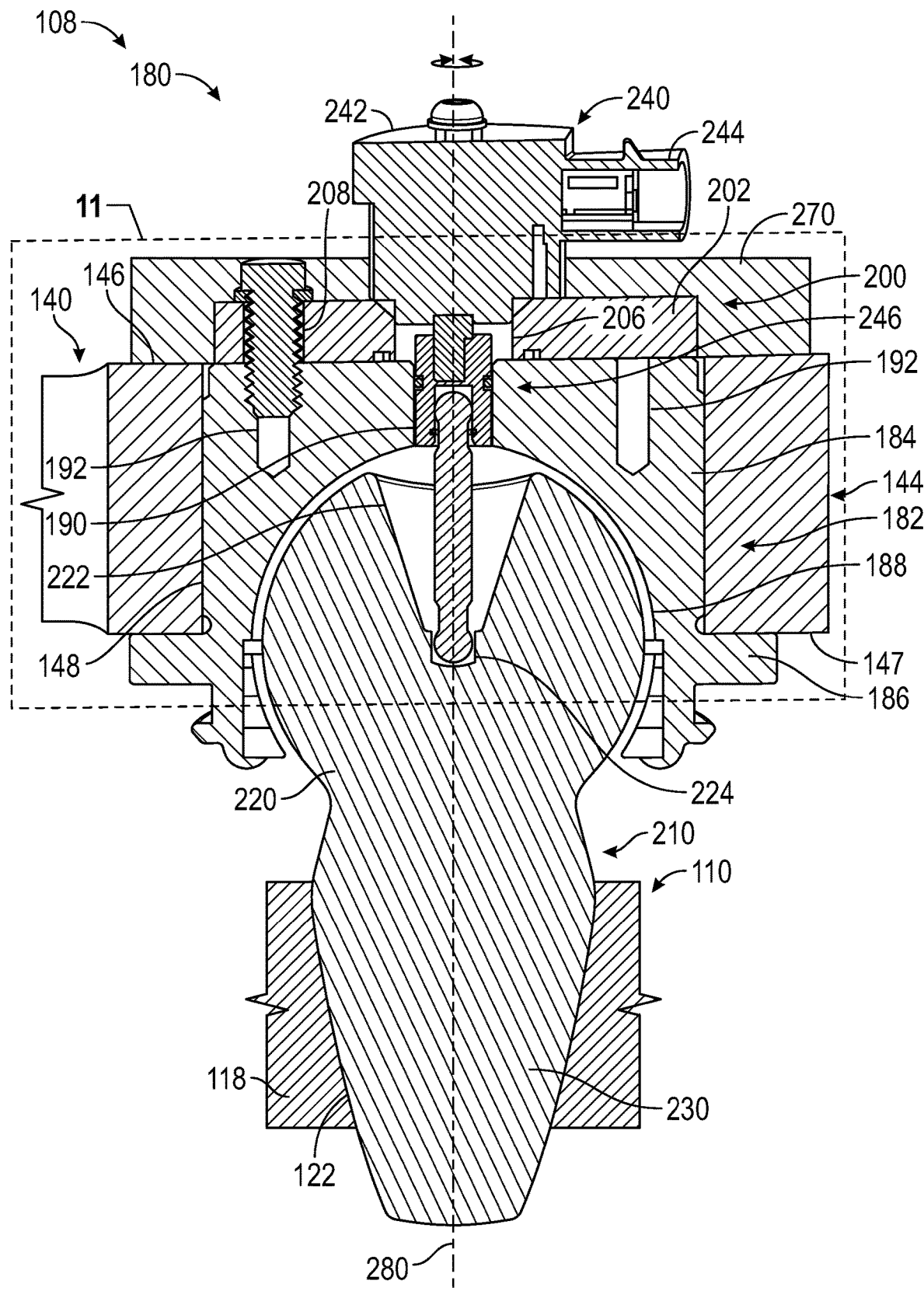
FIG. 8 is cross-sectional view of the ball joint coupling assembly of the control arm and steering knuckle assembly of FIG. 5, according to an exemplary embodiment.
Figure 9:
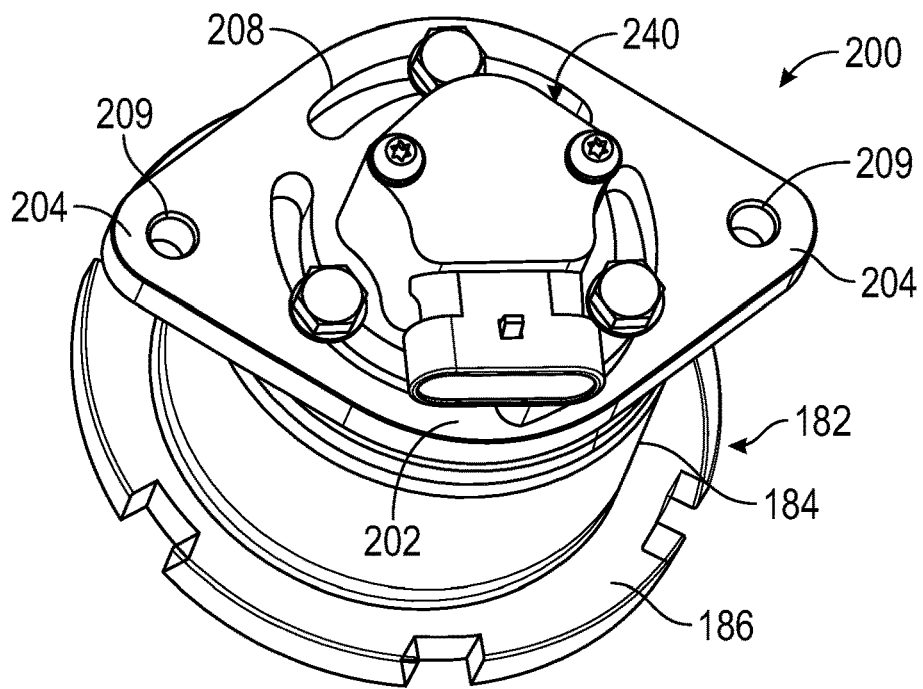
FIG. 9 is detailed perspective view of a ball joint housing, a mounting plate, and a sensor assembly of the ball joint coupling assembly of FIG. 8, according to an exemplary embodiment.
Figure 10:
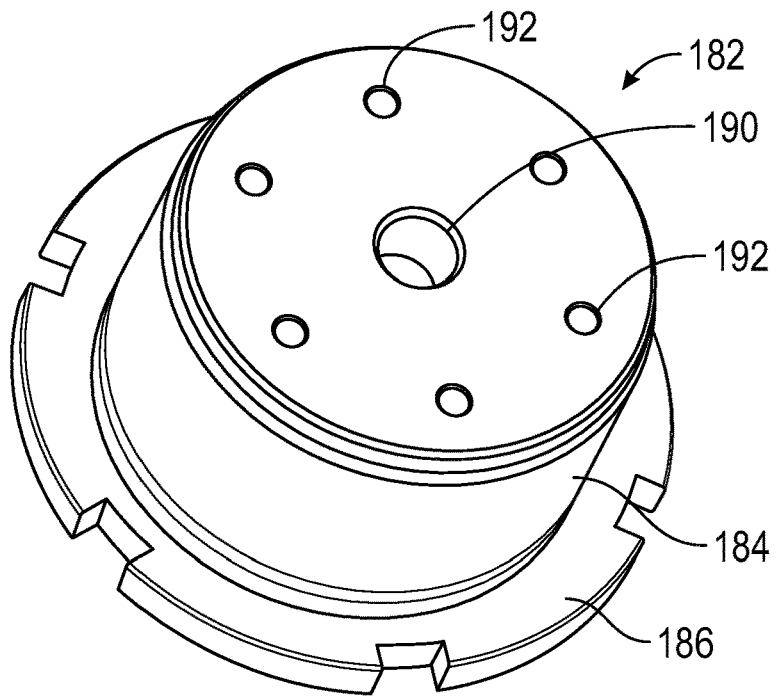
FIG. 10 is detailed perspective view of the ball joint housing of FIG. 9, according to an exemplary embodiment.
Figure 11:
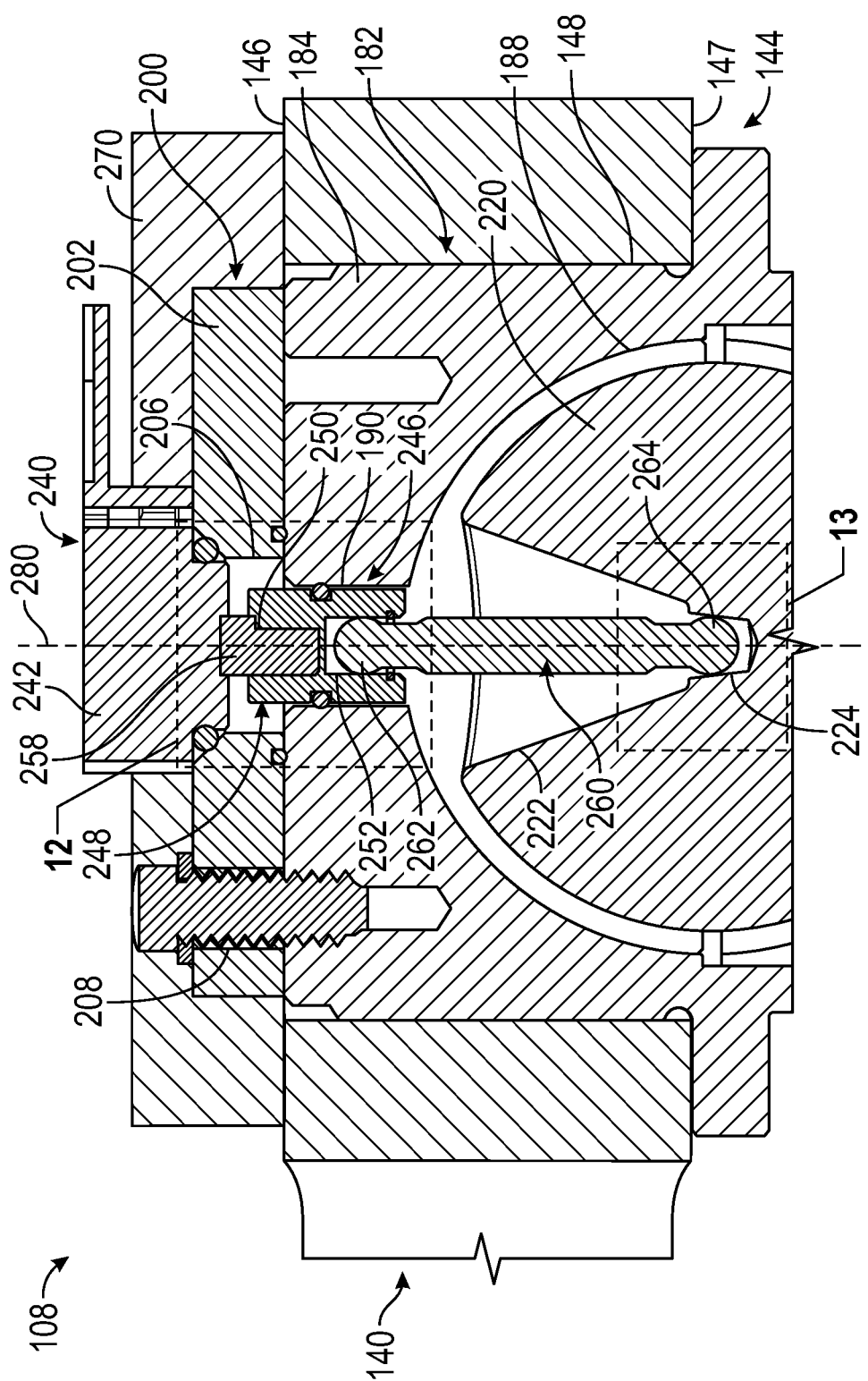
FIG. 11 is a detailed cross-sectional view of an upper portion of the ball joint coupling assembly of FIG. 8, according to an exemplary embodiment.

As shown in FIGS. 8, 9, and 11, the mounting plate 200 has a first portion, shown as center portion 202, with second portions, shown as flanges 204, extending laterally outward from opposing sides of the center portion 202. The center portion 202 defines (i) a second aperture or passageway, shown as sensor passageway 206, at a center thereof and (ii) a plurality of slots, shown as insert coupling slots 208 extending therethrough, and disposed radially outward of and about the sensor passageway 206. Each of the flanges 204 defines a coupling aperture, shown as lid coupling aperture 209.

As shown in FIGS. 8, 9, and 11, the insert 184 of the ball joint housing 182 is insertable into the upper control arm slot 148 positioned at the knuckle end 144 of the upper control arm 140 such that the lip 186 of the ball joint housing 182 engages with the lower mounting surface 147 of the knuckle end 144 of the upper control arm 140. The mounting plate 200 is positionable along the upper mounting surface 146 of the knuckle end 144 of the upper control arm 140 above the upper control arm slot 148 and the ball joint housing 182, with the flanges extending outside of the upper control arm slot 148 and engaging with the upper mounting surface 146 of the knuckle end 144 of the upper control arm 140. The insert coupling slots 208 of the mounting plate 200 align with the plate coupling apertures 192 of the insert 184 of the ball joint housing 182 such that fasteners (e.g., screws, bolts, etc.) may be received by the insert coupling slots 208 and the plate coupling apertures 192 to couple the mounting plate 200 to the ball joint housing 182. Such coupling of the mounting plate 200 to the insert 184 (i) aligns the sensor passageway 206 of the mounting plate 200 and the sensor passageway 190 of the insert 184 and (ii) causes the lip 186 of the insert 184 and the flanges 204 of the mounting plate 200 to engage with the lower mounting surface 147 and the upper mounting surface 146, respectively, of the knuckle end 144 of the upper control arm 140 to secure the upper end of the upper coupler 180 to the upper control arm 140.

As shown in FIGS. 5-8 and 11-14, the ball joint 210 has an upper portion, shown as ball 220, and a lower portion, shown as tapered shaft 230, extending from a lower end of the ball 220. The ball 220 defines a recess, shown as conical recess 222, that has an opening positioned at the upper end of the ball 220, extends into and tapers along the body of the ball 220, and terminates with a pocket, shown as shaft head pocket 224. According to an exemplary embodiment, the shaft head pocket 224 is positioned at or substantially positioned at a center point of the ball 220. According to an exemplary embodiment, the shaft head pocket 224 has a hex shape (e.g., like a hex or socket screw). In other embodiments, the shaft head pocket 224 has another suitable shape.

Figure 14:
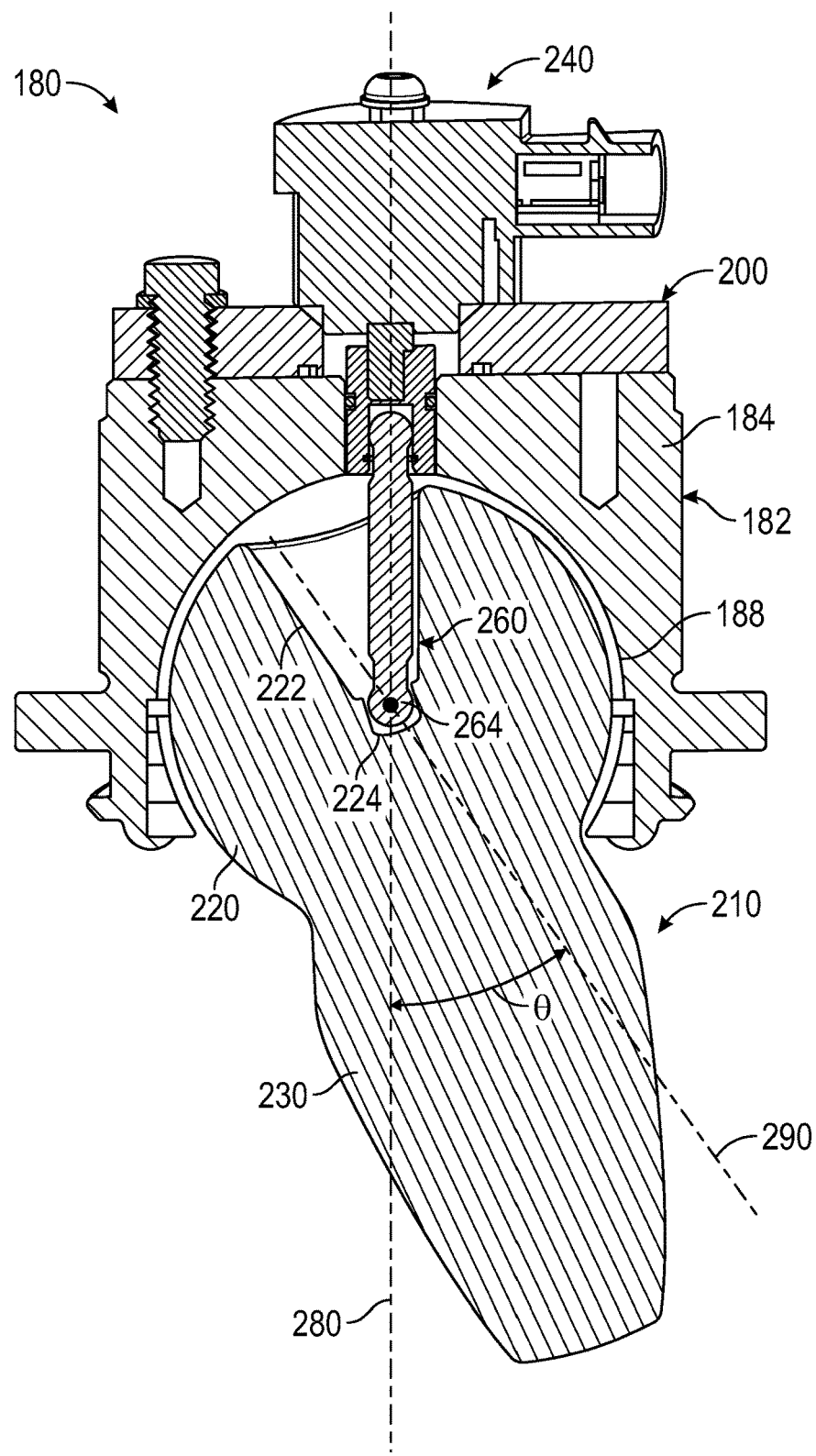
FIG. 14 is a cross-sectional view of the ball joint coupling assembly of FIG. 8 in another orientation, according to an exemplary embodiment.

As shown in FIGS. 5-8,11, and 14, the ball pocket 188 of the ball joint housing 182 receives and retains the ball 220 of the ball joint 210 such that the ball 220 is at least partially disposed within the upper control arm slot 148. As shown in FIGS. 6 and 8, the upper knuckle slot 122 of the upper knuckle arm 118 of the steering knuckle 110 receives the tapered shaft 230 of the ball joint 210. The free end of the tapered shaft 230 may engage with a fastener (e.g., a nut, etc.) on the bottom side of the upper knuckle arm 118 to secure the tapered shaft 230 within the upper knuckle slot 122 of the upper knuckle arm 118. In another embodiment, the ball joint 210 is integrally formed with the steering knuckle 110. Accordingly, the ball joint 210 is configured to pivotably couple the steering knuckle 110 to the upper control arm 140. According to an exemplary embodiment, the ball 220 is configured to rotate within the ball pocket 188 about the longitudinal axis 280 (e.g., in response to the steering knuckle 110 turning via an input to the steering wheel 102). As shown in FIG. 14, the ball 220 is configured to pivot within the ball pocket 188 such that (i) the tapered shaft 230 swings or articulates laterally relative to the longitudinal axis 280 and (ii) a second longitudinal, center axis, shown as longitudinal axis 290, of the ball joint 210 is angled relative to the longitudinal axis 280 of the upper coupler 180 (e.g., in response to jounce and rebound of the coilover 150).

Figure 12:
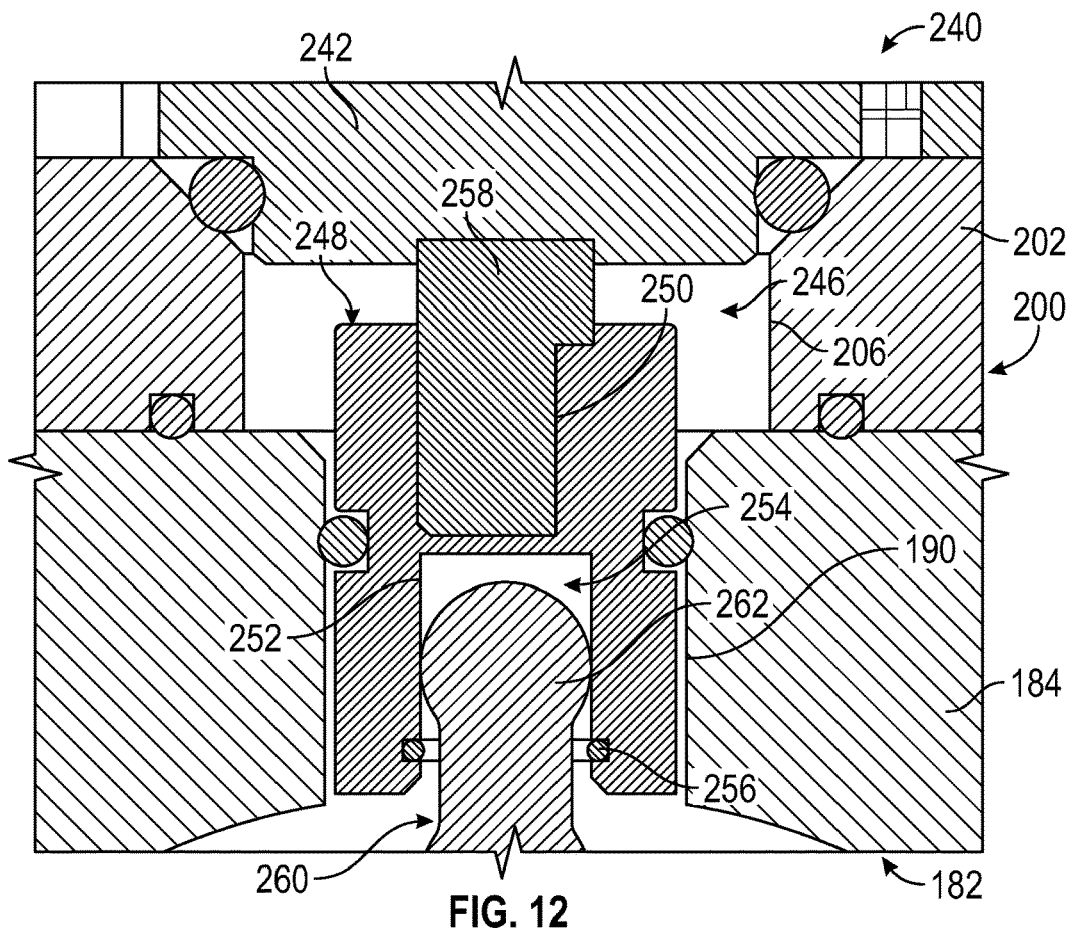
FIG. 12 is a detailed cross-sectional view of a first portion of the upper portion of the ball joint coupling assembly of FIG. 11, according to an exemplary embodiment.

As shown in FIGS. 8,11, and 12, the steering sensor 240 includes (i) a main housing or head, shown as sensor head 242, having a port, shown as connector port 244, extending radially outward therefrom and (ii) a sensor drive assembly, shown as sensor drive assembly 246, coupled to and extending downward from the sensor head 242. According to an exemplary embodiment, the connector port 244 facilitates connecting the steering sensor 240 to the control system 300 to facilitate data transfer therebetween. As shown in FIGS. 8, 11, and 12, the sensor head 242 is coupled (e.g., fastened, using screws, using bolts, etc.) to the top surface of center portion 202 of the mounting plate 200 and over the sensor passageway 206 such that the sensor drive assembly 246 extends (i) through (a) the sensor passageway 206 of the mounting plate 200 and (b) the sensor passageway 190 of the ball joint housing 182 and (ii) into (a) the ball pocket 188 of the ball joint housing 182 and (b) the conical recess 222 of the ball 220 of the ball joint 210.

As shown in FIGS. 11 and 12, the sensor drive assembly 246 includes a bushing, shown as drive bushing 248, positioned within the sensor passageway 206 of the mounting plate 200 and the sensor passageway 190 of the ball joint housing 182. The drive bushing 248 defines a first chamber, shown as upper chamber 250, positioned at a first end of the drive bushing 248 and a second chamber, shown as lower chamber 252, positioned at an opposing second end of the drive bushing 248. The sensor drive assembly 246 additionally includes a retainer, shown as shaft retaining ring 256, disposed within the lower chamber 252 of the drive bushing 248; a sensor drive connector, shown as sensor D drive 258, disposed within the upper chamber 250 of the drive bushing 248, and extending between the drive bushing 248 and the sensor head 242; and a shaft, shown as driveshaft 260, having a first end, shown as upper head 262, disposed within the lower chamber 252 of the drive bushing 248 and an opposing second end, shown as lower head 264, disposed within the shaft head pocket 224 of the conical recess 222 of the ball 220.

Figure 13:
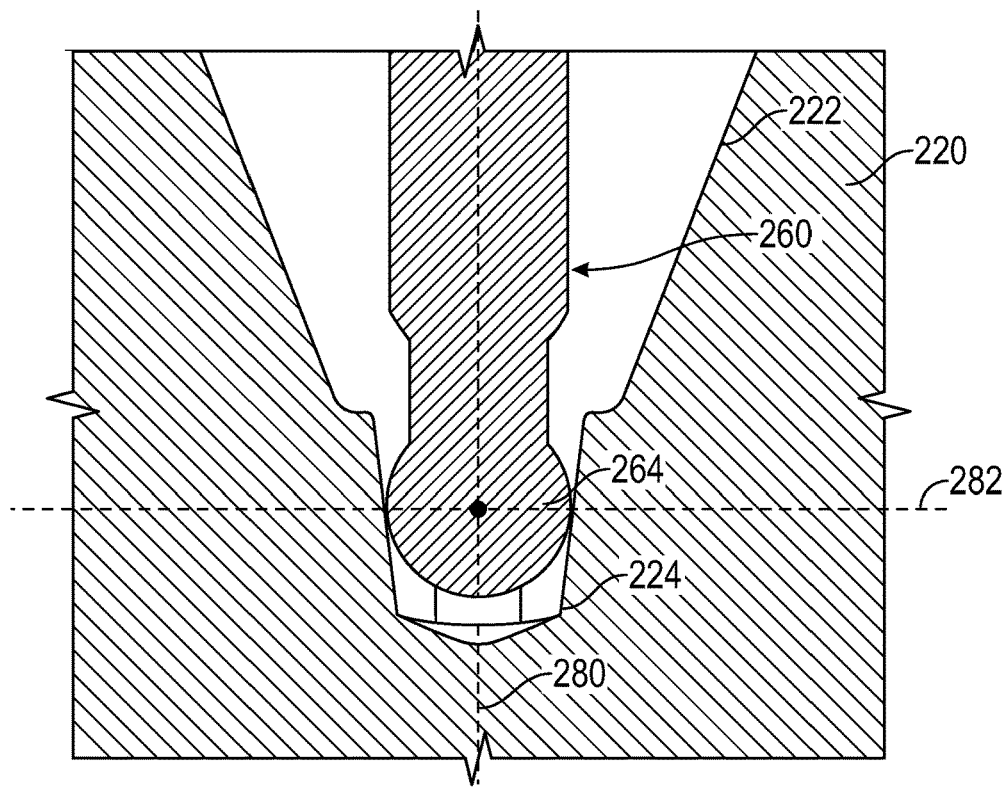
FIG. 13 is a detailed cross-sectional view of a second portion of the upper portion of the ball joint coupling assembly of FIG. 11, according to an exemplary embodiment.

As shown in FIG. 12, the shaft retaining ring 256 is positioned to engage with the upper head 262 of the driveshaft 260 to retain the upper head 262 of the driveshaft 260 within the lower chamber 252 of the drive bushing 248. The shaft retaining ring 256 is at a specific position within the lower chamber 252 such that a gap, shown as wear space 254, is formed between the upper wall of the lower chamber 252 and the upper head 262 of the driveshaft 260. The clearance provided by the wear space 254 is configured to accommodate wear of the ball joint 210 over time. As shown in FIG. 13, the lower head 264 of the driveshaft 260 is disposed within the shaft head pocket 224 of the conical recess 222 of the ball 220 such that a center of the lower head 264 is coincident with or substantially coincident with a center of the ball 220 defined at the intersection of the longitudinal axis 280 and a center, lateral axis, shown as lateral axis 282, of the ball 220.

Figure 15:
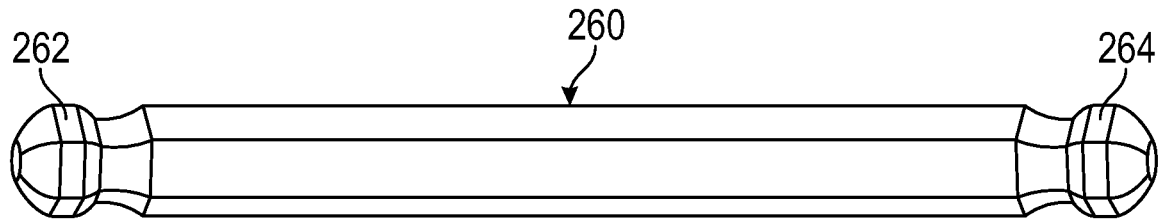
FIG. 15 is a detailed view of a sensor driveshaft of the ball joint coupling assembly of FIG. 8, according to an exemplary embodiment.

As shown in FIG. 15, the driveshaft 260 is configured as a hex shaft where the upper head 262 and the lower head 264 are hex-shaped heads (e.g., like a ball-end hex key). According to an exemplary embodiment, the insert coupling slots 208 of the mounting plate 200 facilitate rotating the mounting plate 200 and, therefore, the driveshaft 260 about the longitudinal axis 280 relative to the ball joint housing 182 and the ball joint 210 during installation to allow for minor adjustments such that the lower head 264 of the driveshaft 260 is properly received by and sits within the shaft head pocket 224 of the conical recess 222 of the ball 220. According to an exemplary embodiment, the shape of the shaft head pocket 224, the shape of the lower chamber 252, the shape of the upper head 262, and the shape of the lower head 264 (i) prevent relative movement/rotation between the drive bushing 248, the ball 220, and the driveshaft 260 about the longitudinal axis 280, but (ii) permit pivoting/articulating movement of the ball 220 (see, e.g., FIG. 14) relative to the longitudinal axis 280 and the lower head 264 of the driveshaft 260. Accordingly, the steering sensor 240 is configured to facilitate acquiring steering data regarding turning of the steering knuckle 110 as the ball joint 210 and the sensor drive assembly 246 turn therewith, while not being affected by the pivoting motion or articulation of the ball joint 210 during jounce and rebound of the coilovers 150. As shown in FIG. 14, the conical recess 222 accommodates a range of articulation of the ball joint 210 relative to the driveshaft 260 and the longitudinal axis 280 up to an angle θ in each direction (i.e., −θ to +θ). According to an exemplary embodiment, the angle θ is dependent on the amount of suspension travel of the coilovers 150 and, thereby, movement of the lower control arm 130 and the steering knuckle 110 relative to the upper control arm 140. In one embodiment, the angle θ is at least 10 degrees. In another embodiment, the angle θ is at least 15 degrees. In still another embodiment, the angle θ is at least 20 degrees. In yet another embodiment, the angle θ is at least 25 degrees.

As shown in FIGS. 5, 8, and 11, the mounting plate cover 270 extends over the mounting plate 200 and the upper control arm slot 148 at the knuckle end 144 of the upper control arm 140, enclosing the upper end of the upper coupler 180 (e.g., preventing dirt, debris, etc. from entering into the upper control arm slot 148 or components of the upper coupler 180). According to an exemplary embodiment, the mounting plate cover 270 is coupled (e.g., secured, attached, etc.) to the mounting plate 200 using fasteners that engage with the lid coupling apertures 209 of the mounting plate 200.

Figure 16:
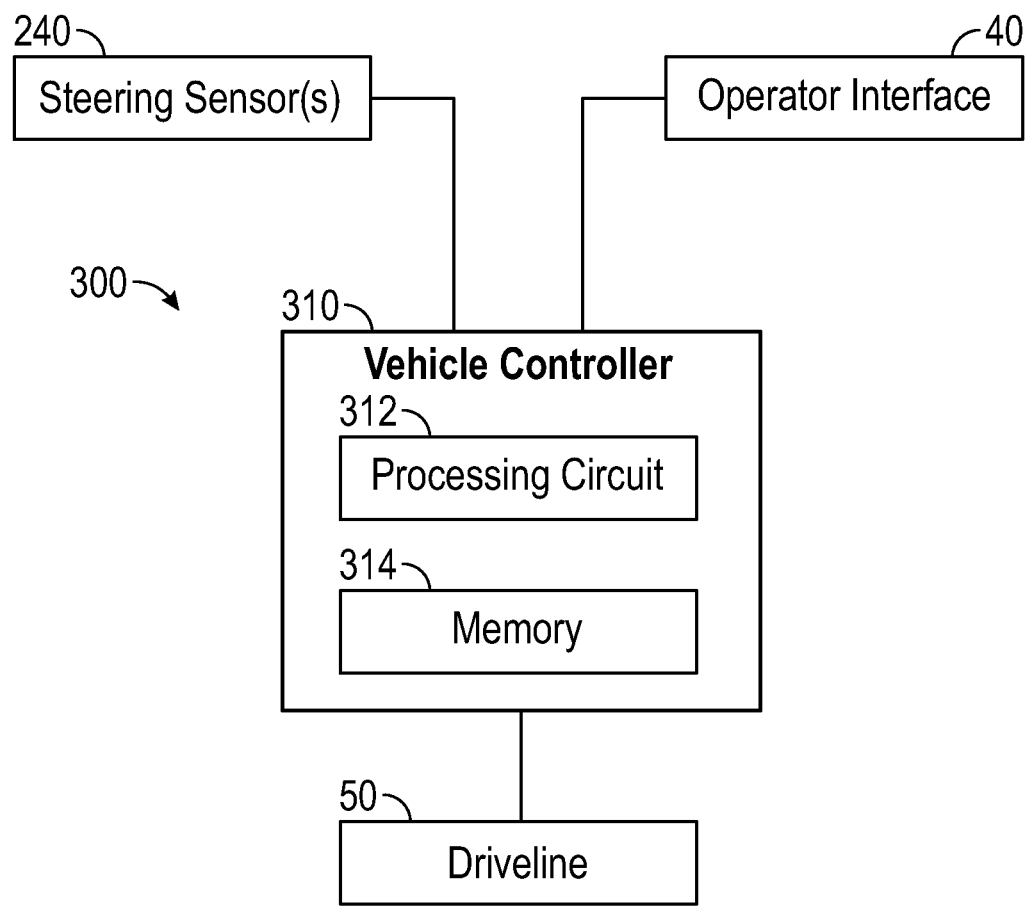
FIG. 16 is a schematic block diagram of a control system of the vehicle of FIG. 1, according to an exemplary embodiment.

According to the exemplary embodiment shown in FIG. 16, the control system 300 for the vehicle 10 includes a controller 310. In one embodiment, the controller 310 is configured to selectively engage, selectively disengage, control, or otherwise communicate with components of the vehicle 10. As shown in FIG. 16, the controller 310 is coupled to (e.g., communicably coupled to) the operator interface 40, the driveline 50, and the steering sensors 240. By way of example, the controller 310 may send and receive signals (e.g., control signals) with the operator interface 40, the driveline 50, and/or the steering sensors 240.

The controller 310 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. According to the exemplary embodiment shown in FIG. 21, the controller 310 includes a processing circuit 312 and a memory 314. The processing circuit 312 may include an ASIC, one or more FPGAs, a DSP, circuits containing one or more processing components, circuitry for supporting a microprocessor, a group of processing components, or other suitable electronic processing components. In some embodiments, the processing circuit 312 is configured to execute computer code stored in the memory 314 to facilitate the activities described herein. The memory 314 may be any volatile or non-volatile computer-readable storage medium capable of storing data or computer code relating to the activities described herein. According to an exemplary embodiment, the memory 314 includes computer code modules (e.g., executable code, object code, source code, script code, machine code, etc.) configured for execution by the processing circuit 312. In some embodiments, the controller 310 may represent a collection of processing devices. In such cases, the processing circuit 312 represents the collective processors of the devices, and the memory 314 represents the collective storage devices of the devices.

In some embodiments, the controller 310 is configured to receive the steering data from the steering sensors 240. The controller 310 may be configured to utilize the steering data to accurately monitor the steering position of the steering knuckle 110 and, thereby, the wheel hubs and the front tractive elements 78. The controller 310 may use the steering data in controlling front suspension controls, cab suspension controls, and control other means to improve ride quality and vehicle operability. In some embodiments, the controller 310 is configured to provide feedback to the operator of the vehicle 10 via the operator interface 40 regarding the steering position of the front tractive elements 78. In some embodiments, the controller 310 is configured to utilize the steering data for guidance purposes. By way of example, the controller 310 may function as a guidance system and use the steering data to facilitate autonomous driving of the vehicle 10 or provide guidance assistance.

It should be understood that the description of the control arm and steering knuckle assemblies 108 as applying to the front axle 76 of the vehicle 10 is for example purposes only. The control arm and steering knuckle assemblies 108 can similarly be applied to a steerable rear axle 86 of the vehicle 10.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the driveline 50, the steering and suspension system 100, the control system 300, etc.) as shown in the various exemplary embodiments is illustrative only. Additionally, any element disclosed in one embodiment may be incorporated or utilized with any other embodiment disclosed herein.

The invention claimed is:

1. A steering system for a machine, the steering system comprising:
a control arm having a first end and an opposing second end, the first end configured to couple to a chassis of the machine, the opposing second end defining an upper mounting surface, a lower mounting surface, and a first passage extending therethrough between the upper mounting surface and the lower mounting surface;
a steering knuckle having a knuckle arm defining a second passage extending therethrough, the steering knuckle configured to couple to a steering linkage assembly of the machine to facilitate turning the steering knuckle;
a ball joint having a ball portion and a shaft portion extending from the ball portion, the ball portion disposed within the first passage and the shaft portion disposed within the second passage, the ball portion defining a conical recess that (i) has an opening at an upper end of the ball portion and (ii) terminates inside the ball portion with a shaft head pocket;
a mounting plate positioned along the upper mounting surface, the mounting plate defining a first sensor passageway;
a ball joint housing disposed within the first passage and coupled to the mounting plate, the ball joint housing defining a ball pocket that receives the ball portion of the ball joint and a second sensor passageway that connects to the ball pocket, the ball joint housing having a peripheral lip extending radially outward from a lower end of the ball joint housing, the peripheral lip positioned to engage with the lower mounting surface; and
a steering sensor including:
a sensor head coupled to a top surface of the mounting plate;
a bushing defining a first chamber and a second chamber;
a connector disposed within the first chamber and extending to the sensor head; and
a driveshaft including an upper shaft head disposed within the second chamber and a lower shaft head that engages with the shaft head pocket, wherein the assembly of the connector, the bushing, and the driveshaft extends along the longitudinal axis and through the first sensor passageway of the mounting plate and through the second sensor passageway of the ball joint housing with the driveshaft extending into the conical recess of the ball portion;
wherein the ball portion is configured to pivot within the first passage of the control arm relative to the longitudinal axis and the shaft head of the driveshaft; and
wherein the ball joint and the driveshaft are configured to rotate together about the longitudinal axis as the steering knuckle is turned.

2. The steering system of claim 1, further comprising the steering linkage assembly, wherein the knuckle arm is a first knuckle arm, and wherein the steering knuckle has a second knuckle arm positioned beneath the first knuckle arm that has an interface that couples to the steering linkage assembly.

3. The steering system of claim 1, wherein the shaft head pocket is positioned at a center point of the ball portion, and wherein the shaft head of the driveshaft is coincident with the center point.

4. The steering system of claim 1, wherein the shaft head pocket and the lower shaft head of the driveshaft are hex-shaped.

5. The steering system of claim 1, wherein the bushing includes a retainer disposed within the second chamber that engages with the upper shaft head to retain the upper shaft head within the second chamber.

6. The steering system of claim 1, wherein a gap is formed between the upper shaft head and an upper wall of the second chamber.

7. The steering system of claim 1, wherein the conical recess is configured to accommodate a range of articulation of the ball joint relative to the driveshaft and the longitudinal axis up to an angle threshold in each direction.

8. The steering system of claim 7, wherein the angle threshold is at least degrees.

9. The steering system of claim 8, wherein the angle threshold is at least degrees.

10. A ball joint coupling assembly for a steering system of a machine, the ball joint coupling assembly defining a longitudinal axis, the ball joint coupling assembly including:
a ball joint housing configured to be received within a first passage of a control arm of the steering system, the ball joint housing defining a ball pocket and a first sensor passageway that connects to the ball pocket, the ball joint housing having a peripheral lip extending radially outward from a lower end of the ball joint housing, the peripheral lip configured to engage with a lower mounting surface of the control arm, the ball joint housing defining a plurality of apertures;
a mounting plate configured to be positioned along an upper mounting surface of the control arm, the mounting plate defining a second sensor passageway that aligns with the first sensor passageway, the mounting plate defining a plurality of slots, the plurality of slots and the plurality of apertures cooperatively receive fasteners to couple the mounting plate to the ball joint housing;
a ball joint including:
a ball portion disposed within the ball pocket, the ball portion defining a conical recess that aligns with the first sensor passageway and the second sensor passageway, the conical recess (i) having an opening at an upper end of the ball portion and (ii) terminating inside the ball portion with a shaft head pocket; and
a shaft portion extending from the ball portion, the shaft portion configured to engage with an interface of a steering knuckle of the steering system; and
a steering sensor including:
a sensor head coupled to a top surface of the mounting plate; and
a driveshaft extending from the sensor head along the longitudinal axis into the conical recess of the ball portion, the driveshaft having a shaft head that engages with the shaft head pocket;
wherein the plurality of slots facilitate rotating the mounting plate about the longitudinal axis relative to the ball joint housing and the ball joint during installation to allow for minor adjustments such that the shaft head of the driveshaft is properly received by and sits within the shaft head pocket of the conical recess of the ball portion;
wherein the ball portion is configured to pivot within the ball pocket relative to the longitudinal axis and the shaft head of the driveshaft; and
wherein the ball joint and the driveshaft are configured to rotate together about the longitudinal axis as the steering knuckle is turned.

11. The ball joint coupling assembly of claim 10, wherein the shaft head pocket is positioned at a center point of the ball portion, and wherein the shaft head of the driveshaft is coincident with the center point, and wherein the shaft head pocket and the shaft head of the driveshaft are hex-shaped.

12. The ball joint coupling assembly of claim 10, wherein the conical recess is configured to accommodate a range of articulation of the ball joint relative to the driveshaft and the longitudinal axis up to an angle threshold in each direction, and wherein the angle threshold is at least 15 degrees.

13. A steering system for a machine, the steering system including:
a control arm having a first end and an opposing second end, the first end configured to couple to a chassis of the machine, the opposing second end of the control arm defining an upper mounting surface, a lower mounting surface, and a first passage extending between the upper mounting surface and the lower mounting surface;

a steering knuckle having a knuckle arm defining a second passage extending therethrough, the steering knuckle configured to couple to a steering linkage assembly of the machine to facilitate turning the steering knuckle; and a ball joint coupling assembly including:
- a ball joint housing disposed within the first passage of the control arm, the ball joint housing defining a ball pocket and a first sensor passageway that connects to the ball pocket, the ball joint housing having a peripheral lip extending radially outward from a lower end of the ball joint housing, the peripheral lip in engagement with the lower mounting surface of the control arm;
- a mounting plate positioned along the upper mounting surface of the control arm, the mounting plate coupled to the ball joint housing, the mounting plate defining a second sensor passageway that aligns with the first sensor passageway;
- a ball joint including:
  - a ball portion disposed within the ball pocket, the ball portion defining a conical recess that aligns with the first sensor passageway and the second sensor passageway, the conical recess (i) having an opening at an upper end of the ball portion and (ii) terminating inside the ball portion with a shaft head pocket; and
  - a shaft portion extending from the ball portion, the shaft portion disposed within the second passage of the steering knuckle; and
- a steering sensor including:
  - a sensor head coupled to a top surface of the mounting plate; and
  - a driveshaft extending from the sensor head into the conical recess of the ball portion, the driveshaft having a shaft head that engages with the shaft head pocket.

14. The steering system of claim 13, wherein the shaft head pocket is hex-shaped, and wherein the shaft head of the shaft is a ball-end hex key.

15. The steering system of claim 13, wherein each of the driveshaft and the ball joint has a unitary structure.

16. The steering system of claim 13, further comprising one or more fasteners extending between the mounting plate and the ball joint housing.

17. The steering system of claim 13, wherein the ball joint housing has an upper end opposite the lower end, and wherein the upper end defines the first sensor passageway.

18. The steering system of claim 13, wherein the steering sensor includes a bushing at least partially disposed within the first sensor passageway, wherein the shaft head is a lower shaft head, wherein the driveshaft includes an upper shaft head in engagement with the bushing.

19. The steering system of claim 18, wherein the steering sensor includes a connector extending from the bushing, through the second sensor passageway, and to the sensor head.

20. The steering system of claim 13, wherein the ball portion defines a center, lateral axis, and wherein the shaft head pocket is positioned at a center point of the ball portion defined at the intersection of the longitudinal axis and the center, lateral axis.

* * * * *